United States Patent
Robinson

(10) Patent No.: US 10,667,007 B2
(45) Date of Patent: May 26, 2020

(54) AUTOMATED VIDEO CONTENT DISPLAY CONTROL USING EYE DETECTION

(71) Applicant: Lenovo (Singapore) Pte. Ltd., Singapore (SG)

(72) Inventor: Douglas Warren Robinson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 256 days.

(21) Appl. No.: 14/161,214

(22) Filed: Jan. 22, 2014

(65) Prior Publication Data

US 2015/0208125 A1    Jul. 23, 2015

(51) Int. Cl.
| | |
|---|---|
| H04N 21/442 | (2011.01) |
| H04N 21/4223 | (2011.01) |
| H04N 21/433 | (2011.01) |
| H04N 21/439 | (2011.01) |
| H04N 21/443 | (2011.01) |

(52) U.S. Cl.
CPC ... *H04N 21/44218* (2013.01); *H04N 21/4223* (2013.01); *H04N 21/439* (2013.01); *H04N 21/4333* (2013.01); *H04N 21/4334* (2013.01); *H04N 21/4436* (2013.01)

(58) Field of Classification Search
CPC ......... H04N 21/44218; H04N 21/4223; H04N 21/4333; H04N 21/4334; H04N 21/439; H04N 21/4436
See application file for complete search history.

(56) References Cited

U.S. PATENT DOCUMENTS

| | | | |
|---|---|---|---|
| 9,690,455 B1* | 6/2017 | Bilinski | G06F 3/0484 |
| 2005/0199783 A1* | 9/2005 | Wenstrand | G06F 1/3203 |
| | | | 250/214.1 |
| 2005/0281531 A1* | 12/2005 | Unmehopa | H04N 5/76 |
| | | | 386/230 |
| 2006/0188234 A1* | 8/2006 | Takeshita | H04N 5/76 |
| | | | 386/228 |
| 2006/0280445 A1* | 12/2006 | Masaki | G11B 19/02 |
| | | | 386/282 |
| 2007/0033607 A1* | 2/2007 | Bryan | H04H 60/27 |
| | | | 725/10 |
| 2010/0107184 A1* | 4/2010 | Shintani | H04N 21/42201 |
| | | | 725/10 |
| 2010/0122277 A1* | 5/2010 | Fonseca | G11B 27/105 |
| | | | 725/10 |
| 2010/0205667 A1* | 8/2010 | Anderson | G06F 3/013 |
| | | | 726/19 |
| 2011/0080529 A1* | 4/2011 | Wong | G06F 3/011 |
| | | | 348/734 |
| 2011/0109809 A1* | 5/2011 | Dai | H04N 5/44 |
| | | | 348/730 |
| 2011/0129196 A1* | 6/2011 | Hayashi | H04L 12/2812 |
| | | | 386/234 |

(Continued)

FOREIGN PATENT DOCUMENTS

WO    WO 2015078240 A1 *    6/2015    ............ G06F 3/012

*Primary Examiner* — John R Schnurr
(74) *Attorney, Agent, or Firm* — Ference & Associates LLC

(57) ABSTRACT

An embodiment provides a method, including: capturing, with an image sensor, an image of a user; detecting, using a processor, at least one open eye of the user within the image; and responsive to said detecting, maintaining display of video content for a predetermined time. Other aspects are described and claimed.

25 Claims, 3 Drawing Sheets

(56) References Cited

U.S. PATENT DOCUMENTS

| | | | |
|---|---|---|---|
| 2011/0135114 A1* | 6/2011 | Oba | G06F 1/3203 381/107 |
| 2011/0142411 A1* | 6/2011 | Camp | G11B 27/105 386/228 |
| 2011/0157468 A1* | 6/2011 | Dai | H04N 5/63 348/552 |
| 2011/0274405 A1* | 11/2011 | Godar | H04N 5/781 386/224 |
| 2012/0114194 A1* | 5/2012 | Kim | G06K 9/00221 382/115 |
| 2012/0224043 A1* | 9/2012 | Tsurumi | H04N 21/4223 348/78 |
| 2012/0254909 A1* | 10/2012 | Serdiuk | H04N 7/163 725/12 |
| 2012/0300061 A1* | 11/2012 | Osman | G06F 1/3231 348/135 |
| 2013/0011114 A1* | 1/2013 | Tashiro | G11B 27/105 386/230 |
| 2013/0136422 A1* | 5/2013 | Lim | H04N 5/782 386/291 |
| 2014/0098116 A1* | 4/2014 | Baldwin | G06F 3/011 345/522 |
| 2014/0150002 A1* | 5/2014 | Hough | H04N 21/4415 725/9 |
| 2014/0201767 A1* | 7/2014 | Seiden | H04N 21/44218 725/12 |
| 2014/0310744 A1* | 10/2014 | Gelonese | H04N 21/4436 725/34 |
| 2014/0313120 A1* | 10/2014 | Kamhi | G06K 9/00604 345/156 |
| 2014/0341533 A1* | 11/2014 | Pai | G06F 1/3231 386/230 |
| 2014/0375791 A1* | 12/2014 | Huang | H04N 5/63 348/78 |
| 2015/0095927 A1* | 4/2015 | NaikRaikar | H04N 21/44222 725/14 |
| 2015/0235075 A1* | 8/2015 | Rose | G06F 1/3215 382/103 |
| 2015/0332085 A1* | 11/2015 | Yu | G06F 3/013 345/156 |
| 2016/0106355 A1* | 4/2016 | Perugupalli | G06K 9/0061 351/210 |
| 2016/0133021 A1* | 5/2016 | Gouda | H04N 5/23219 382/103 |
| 2017/0048582 A1* | 2/2017 | Zhang | H04N 21/44218 |
| 2017/0208364 A1* | 7/2017 | Glazier | H04N 21/41407 |

* cited by examiner

AUTOMATED VIDEO CONTENT DISPLAY CONTROL USING EYE DETECTION

BACKGROUND

Information handling devices ("devices"), for example televisions (TVs), laptop computers, desktop computers, digital video recorders (DVRs), game consoles, DVD/BLU-RAY players, smart phones, tablets, etc., may be used to view video content in various formats. By way of example, smart TVs offer users a way to display content derived from a variety of sources, e.g., display of traditional broadcast/cable television media, playback of stored media content from on-demand systems and Internet sources, display and playback of media derived from connected devices (such as personal computing devices), etc.

Many control features have been added to such devices in an effort to make video content display and playback more user-friendly. For example, displayed content may be paused, stopped, fast forwarded, etc., even if live TV content is being displayed, e.g., by using of a cache memory that buffers content delivered to the device. Moreover, user's may skip ahead or behind within programs, jump to different "chapters" or positions within video content, restart display of video content from a marked position, etc. Many of these controls require manual inputs from the user, e.g., using a remote control device or otherwise require the user's active participation, e.g., via voice command or some such positive user input.

BRIEF SUMMARY

In summary, one aspect provides a method, comprising: capturing, with an image sensor, an image of a user; detecting, using a processor, at least one open eye of the user within the image; and responsive to said detecting, maintaining display of video content for a predetermined time.

Another aspect provides an information handling device, comprising: an image sensor; a processor operatively coupled to the image sensor; and a memory device storing instructions executable by the processor to: capture, with the image sensor, an image of a user; detect at least one open eye of the user within the image; and responsive to detecting at least one open eye of the user within the image, maintain display of video content for a predetermined time.

A further aspect provides an information handling device, comprising: a display device; a processor operatively coupled to the display device; and a memory device storing instructions executable by the processor to: receive a signal indicating that at least one open eye of a user viewing the display device has been detected; and responsive to receipt of said signal, maintain display of video content for a predetermined time.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
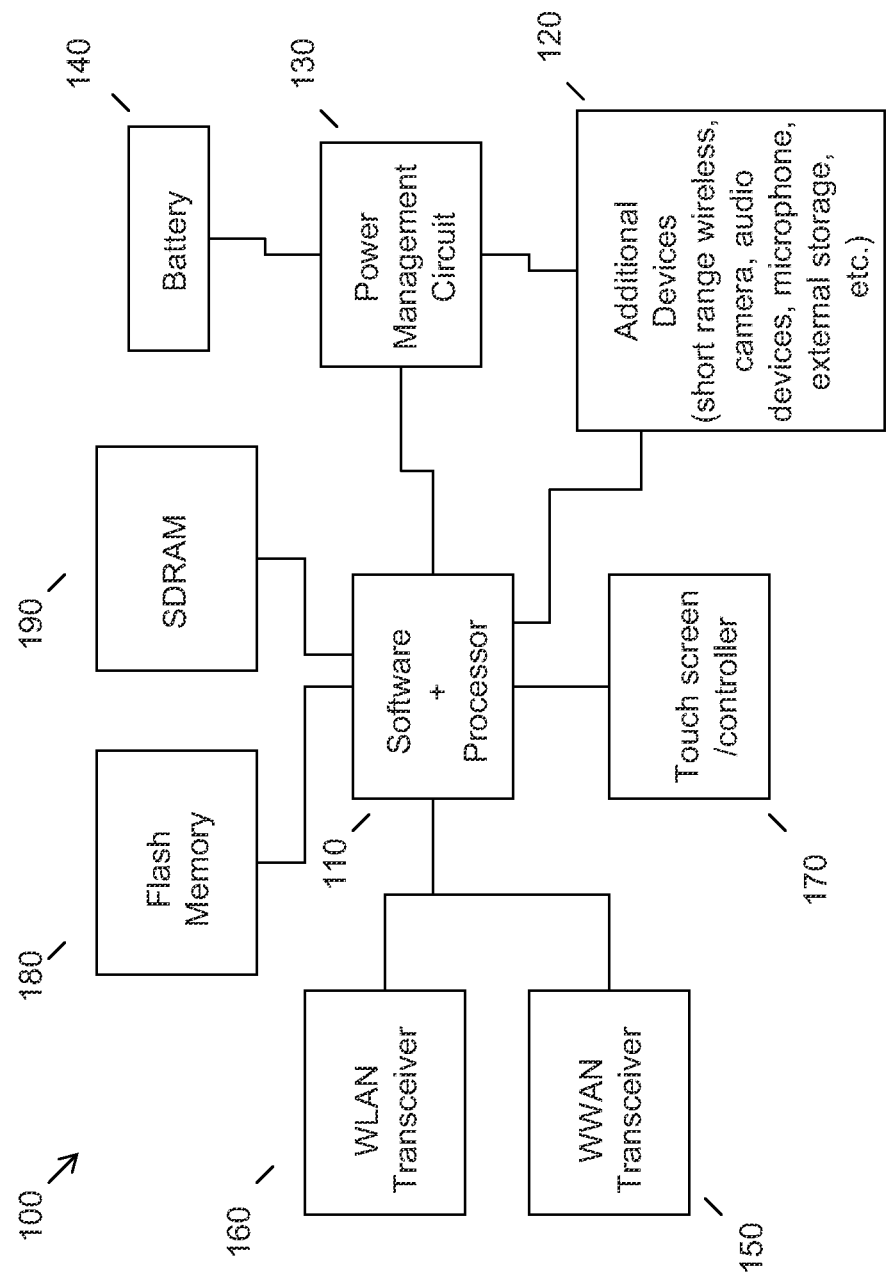
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While manual video content display features make viewing quite convenient, as various sensing technologies have progressed, devices have offered more automated control features. For example, use of head tracking software has been implemented for automatic or smart pausing of video content playback, e.g., allowing temporary pausing of video when users look away from the display screen. However, such features are limited in many respects and, while potentially useful, are not tailored to particular use cases.

As an example, a user often leaves a device in display mode unintentionally. This may occur because the user has fallen asleep while watching the content. In such circumstances, while a manual timer may be set, this requires user planning. Moreover, conventional sensing technologies, e.g., head tracking, motion sensing, etc., do not appropriately address the issue. Specifically, head tracking may become overly active and pause video inappropriately, e.g., simply based on a user looking away, or inactive, e.g., when a user falls asleep while still oriented towards the display. Likewise, motion-sensing technology may pause or halt playback when a user is watching but not moving.

Accordingly, an embodiment provides an intelligent system that conveniently manages video content display for users that are not actively watching the video content, e.g., users that have fallen asleep in front of the television. An embodiment employs eye detection to determine if at least one user is watching the video content. If it is detected that at least one user is not watching the video content, an embodiment may take a predetermined action, e.g., pausing the video content display, stopping the video content display, adjusting the volume of audio associated with the video content display, etc. The predetermined action may include energy saving actions, e.g., powering off of a device or device component used to display the video content as well as user-convenience actions, e.g., marking a position in the video content where user watching left off for later display, storing video content in cache or persistent (non-volatile memory), and/or a combination of the foregoing, etc. Otherwise, an embodiment may continue the video content display, e.g., for a predetermined time (until a next open eye detection).

An embodiment may accommodate a multi-user environment. For example, at minimum, an embodiment detects at least one open eye of a user, e.g., in the field of view of a camera utilized for open eye detection, to make a determination as to handling of display mode. Thus, if multiple open eyes are detected, an embodiment maintains video content status (e.g., active display of content); whereas if at least one open eye is not detected, an embodiment may implement controlling of video content display, as further described herein.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a camera. Commonly, system 100 will include a touch screen/controller 170 for data input and display. System 100 also typically includes various memory devices, for example flash memory 180 and SDRAM 190.

Figure 2:
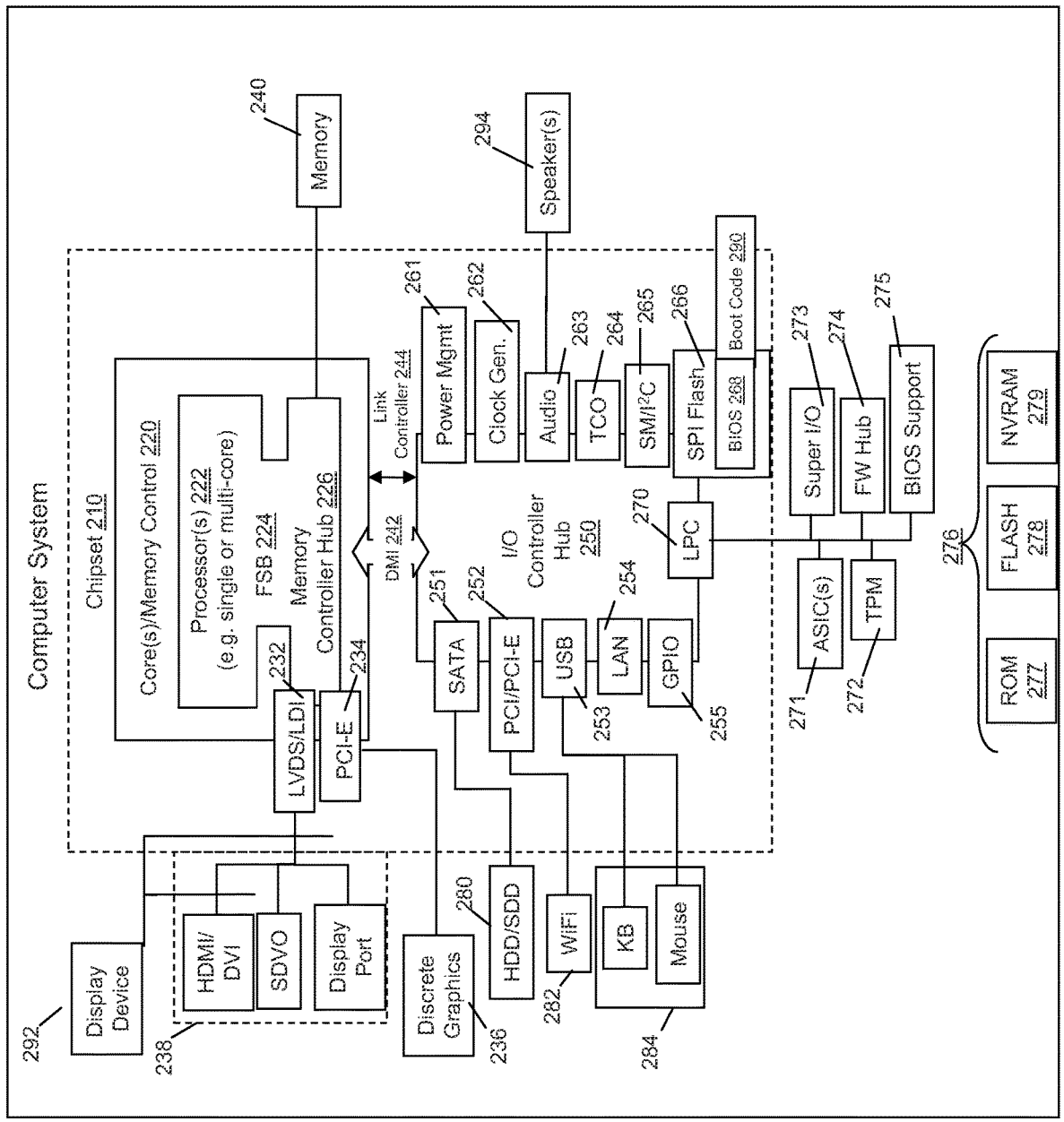
FIG. 2 illustrates another example of information handling device circuitry.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called set 210 (a group of integrated circuits, or chips, that work together, sets) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, et cetera) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may used in devices such as a smart TV that provide video content display. However, as will be noted by those having ordinary skill in the art, the various circuitry and components may be included in other devices and in other combinations. Likewise, a variety of devices may be utilized in connection with the various embodiments described herein, such as DVRs, BLURAY players, laptop or tablet computing devices, etc. It will also be noted that combinations of devices may be utilized, e.g., a laptop computing device operatively coupled to a television or flat panel display, etc.

Figure 3:
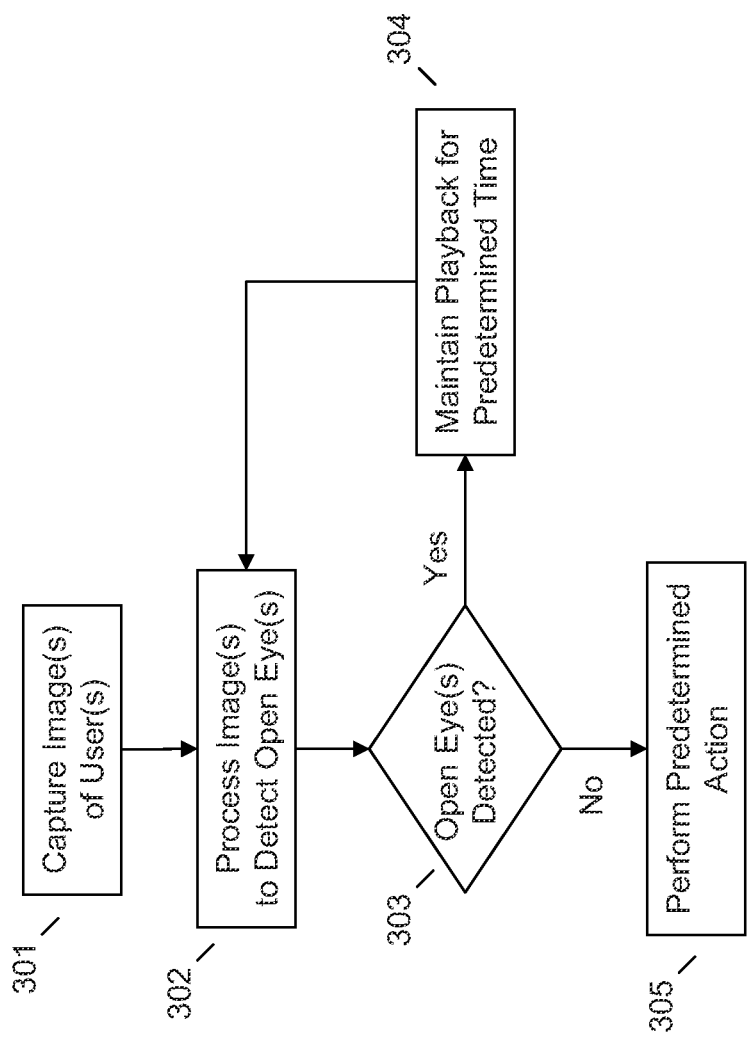
FIG. 3 illustrates an example method of automated video content display control using eye detection.

In an embodiment, referring to FIG. 3, a form of eye tracking is employed to detect that an active user is viewing the video content display. For example, a camera or other optical sensor, e.g., embedded into or operatively coupled to a device, captures images of a user at 301. The images captured are processed at 302 to detect a feature of interest, in this case an open eye of a user viewing the video content display. Thus, an embodiment may perform frequent, periodic or otherwise timed (e.g., according to some timing policy, which may be modified by a user) image captures and/or image processing at 301 and/or 302, respectively. Additionally, detection of at least one open eye at 303 may be timed, again according to an appropriate timing policy.

An embodiment for example may periodically detect that at least one open eye is contained (in a detectable fashion) within a captured image via processing the image at 302. A variety of open eye detection techniques may be employed, e.g., matching features of an open eye within the image to predetermined features or patterns thereof, e.g., for example stored in a memory of the device. More complex eye tracking may be employed, e.g., not only detecting a user's open eye within an image but sub-features thereof, e.g., estimated focal point, assignment of a particular detected open eye to a particular user, etc., for example using an eye tracking system. An example gaze tracking or eye tracking software is FACELAB software available from Seeing Machines Limited, Canberra, Australia. FACELAB is a trademark of Seeing Machines Limited.

If at least one open eye of a user is detected at 303, an embodiment may maintain display of video content at 304, e.g., for a predetermined time. That is, by detecting at least one open eye, an embodiment may map this to a situation in which at least one user is viewing the video content. However, if an embodiment does not detect at least one open eye at 303, e.g., a predetermined time has elapsed since the last successful eye detection, one or a plurality of predetermined action(s) may be performed at 305.

In an embodiment, the performance of a predetermined action need not proceed immediately (or substantially immediately) following the failure to detect at least one open eye of a user at 303. Likewise, the choice of which predetermined action(s) to be performed may be influenced based on how long a time has elapsed since the last successful detection of at least one open eye at 303. For example, a predetermined time may be used in which the video content display is continued or maintained. This predetermined time may be somewhat extensive as compared to other video content controlling techniques, e.g., on the order of minutes. This permits flexibility such that a failure to detect at least one open eye of the user does not necessarily immediately cause the display of the video content to be interrupted or adjusted by a predetermined action.

In an embodiment, however, a predetermined action may take place immediately or substantially immediately following the failure to detect at least one open eye of a user at 303. For example, a bookmark (marking) may be made substantially immediately following the failure to detect at least one eye. As will be appreciated, as with detecting/not detecting at least one open eye, the placement of the marking may be conducted in a variety of ways, e.g., a mark placed with every successful open eye detection at 303, with the last known open eye detection used as the marking for video playback resumption, a mark placed at a position of video playback within a predetermined time since a last successful open eye detection, etc.

In the example of a DVR or like device that provides a cache memory for holding an amount of video content, such caches often hold approximately 1-2 hours of content. An embodiment may use lack of viewing (e.g., a predetermined time lapse since last successful detection of at least one open eye at 303) for managing cache or other memory content.

For example, an embodiment may, at the moment of lack of viewing is determined, mark a position of content in the cache (volatile memory) and transfer the contents to non-volatile memory, e.g., store the cached contents to the hard drive. Various other techniques may be employed, e.g., depending on the particular device(s) being utilized and/or the needs/desires of the users; however, it should be understood that lack of open eye detection may be utilized by an embodiment to intelligently manage storage of video content in memory or memories, e.g., such that a user may later resume playback of video content. This allows a user to, for example, fall asleep while watching a movie and have the movie re-start from approximately the point of lack of open eye detection without need of worrying that a cache memory size will be exceeded.

Therefore, following the determination that at least one open eye has not been detected at 303, an embodiment performs one or a plurality of predetermined actions. These actions may include actions deemed appropriate for controlling video content display in the circumstance where there is no active user watching the video content, such as a user falling asleep in front of the television. Thus, an embodiment may turn off the television and/or devices utilized to display and/or playback the video content. An embodiment may adjust the volume up or down (so as to alert or not disturb a sleeping user, respectively). An embodiment may perform a plurality of actions, e.g., pausing video display and/or playback, powering off devices, marking and buffering and/or persistently storing video content in memory for later display, etc.

Using an embodiment, a user may display video content with the knowledge that the video content display will be stopped; device(s) will be powered off, etc., if the user should fall asleep or otherwise stop actively viewing the video content. An embodiment leverages the ability to capture images of the user and detect open eye(s) therein for intelligently managing video content display, including resuming display from a position at which a user stopped actively watching the video content. As described herein, an embodiment may buffer or otherwise mark and store video content following lack of detection of an active viewer.

Additionally, as noted herein, an embodiment may provide users ample opportunity to tune the system as desired. For example, a user may adjust the frequency of open eye detection and/or image captures, the time between open eye detection processing, the sensitivity of the open eye detection, the nature of the predetermined actions and the like. This helps ensure that the system meets a user's expectations and adequately assists the user in managing video content display in an automated fashion without overly intruding on the user's control thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following:

a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    capturing, with an image sensor, an image of a plurality of users, wherein the capturing is performed according to a timing policy, wherein the timing policy is tuned by a user;
    detecting, using a processor, at least one eye of more than one of the plurality of users within the image, wherein the detecting comprises estimating, using an eye tracking system, a focal point of the user, wherein a sensitivity of the detecting is tuned by the user;
    performing a predetermined action based upon a current state of the at least one eye of the more than one of the plurality of users, wherein the predetermined action to be performed is selected from a plurality of predetermined actions, wherein the predetermined action to be performed is based upon a length of time that has elapsed between a previous state of the at least one eye and the current state of the at least one eye, wherein the current state is different than the previous state and wherein the predetermined action is selected by the user;
    the performing a predetermined action comprising maintaining display of video content based upon the state of the at least one eye being open and marking, based upon the state of the at least one eye being not open, a position of the video content in cache and transferring contents of the cache to non-volatile memory, and performing an additional predetermined action selected from the group consisting of: pausing the video content, stopping the video content, adjusting a volume of audio associated with the video content, powering off a device displaying the video content, and continuing the video content for a predetermined time; and
    resuming the video content from the position upon detecting an active viewer.

2. The method of claim 1, wherein the predetermined action performed comprises initiating storage of video content.

3. The method of claim 1, wherein the predetermined action performed comprises at least one of pausing display of video content and stopping display of video content.

4. The method of claim 1, wherein said performing a predetermined action is selected from the group consisting of: raising the volume of audio associated with display of video content, and lowering the volume of audio associated with display of video content.

5. The method of claim 1, wherein the predetermined action performed comprises marking a position of video content.

6. The method of claim 5, wherein the position marked is associated with a last successful detection of the state of the at least one eye of the user is open.

7. The method of claim 5, wherein the predetermined action performed comprises storing in memory video content associated with said position marked.

8. The method of claim 5, further comprising displaying video content at said marked position responsive to a detection selected from the group consisting of detecting at least one user eye and detecting a user override event.

9. The method of claim 1, wherein the predetermined action performed comprises transferring video content from volatile memory to non-volatile memory.

10. The method of 9, wherein the predetermined action performed comprises marking a position of video content.

11. The method of claim 1, wherein the performing a predetermined action comprises performing a predetermined action a predetermined time after a last successful detection of at least one eye open of the user.

12. The method of claim 1, wherein the predetermined action performed is selected from the group consisting of: powering off a device and adjusting a volume of audio associated with display of video content.

13. The method of claim 1, wherein the performed action is further based upon a length of time of not detecting that the state of the at least one eye of the user is open.

14. The method of claim 1, wherein the detecting occurs at a predetermined frequency selected by the user.

15. The method of claim 1, wherein a user provides input configuring at least one parameter selected from the group consisting of: a performed predetermined action, a sensitivity of the detecting, and a length of time of not detecting that the state of the at least one eye of the user is open for performing a particular predetermined action.

16. An information handling device, comprising:
an image sensor;
a processor operatively coupled to the image sensor; and
a memory device storing instructions executable by the processor to:
capture, with the image sensor, an image of a plurality of users, wherein the capturing is performed according to a timing policy, wherein the timing policy is tuned by a user;
detect at least one eye of more than one of the plurality of users within the image, wherein to detect comprises to estimate, using an eye tracking system, a focal point of the user, wherein a sensitivity of the detecting is tuned by the user;
perform a predetermined action based upon a current state of the at least one eye of the more than one of the plurality of users, wherein the predetermined action to be performed is selected from a plurality of predetermined actions, wherein the predetermined action to be performed is based upon a length of time that has elapsed between a previous state of the at least one eye and the current state of the at least one eye, wherein the current state is different than the previous state and wherein the predetermined action is selected by the user;
to perform a predetermined action comprising maintaining display of video content based upon the state of the at least one eye being open and marking, based upon the state of the at least one eye being not open, a position of the video content in cache and transferring contents of the cache to non-volatile memory, and performing an additional predetermined action selected from the group consisting of: pausing the video content, stopping the video content, adjusting a volume of audio associated with the video content, powering off a device displaying the video content, and continuing the video content for a predetermined time; and
resume the video content from the position upon detecting an active viewer.

17. The information handling device of claim 16, wherein said performing a predetermined action is selected from the group of consisting of: raising the volume of audio associated with display of video content, and lowering the volume of audio associated with display of video content.

18. The information handling device of claim 16, wherein the predetermined action performed comprises marking a position of video content.

19. The information handling device of claim 18, wherein the position marked is associated with a last successful detection of the state of the at least one eye of the user is open.

20. The information handling device of claim 18, wherein the instructions are further executable by the processor to display video content at said marked position responsive to a detection selected from the group consisting of: detecting at least one user eye, and detecting a user override event.

21. The information handling device of claim 16, wherein the predetermined action performed comprises transferring video content from volatile memory to non-volatile memory, and further wherein the predetermined action performed comprises marking a position of video content.

22. The information handling device of claim 16, wherein the performing a predetermined action comprises performing a predetermined action a predetermined time after a last successful detection of at least one eye open of the user.

23. An information handling device, comprising:
a display device;
a processor operatively coupled to the display device; and
a memory device storing instructions executable by the processor to:
track a user gaze associated with each of a plurality of users, the user gaze indicating that at least one open eye of at least one of the plurality of users is viewing the display device, wherein to track comprises to estimate, using an eye tracking system, a focal point of the user, wherein the tracking is performed according to a timing policy, wherein both the timing policy and a sensitivity of the tracking are tuned by a user;
responsive to tracking the user gaze, maintain display of video content;
detect that none of the plurality of users are viewing the display device based upon tracking the user gaze of the plurality of users; and
perform a predetermined action based upon the plurality of users not viewing the display device, wherein the predetermined action to be performed is selected from a plurality of predetermined actions, wherein the predetermined action to be performed is based upon the length of time that has elapsed between at least one of the plurality of users viewing the display device and no user viewing the display device wherein the predetermined action comprises marking a position of the video content in cache and transferring contents of the cache to non-volatile memory and performing an additional predetermined action and wherein the additional predetermined action is selected by the user and wherein the additional predetermined action is selected from the group consisting of: pausing the video content, stopping the video content, adjusting a volume of audio associated with the video content, powering off a device displaying the video content, and continuing the video content for a predetermined time; and
resume the video content from the position upon detecting an active viewer.

24. The information handling device of claim 23, wherein the instructions are further executable by the processor to perform a predetermined action a predetermined time after a last successful detection of at least one open eye of the user.

25. A method, comprising:
capturing, with an image sensor, an image of a plurality of users viewing a display device, wherein the capturing is performed according to a timing policy, wherein the timing policy is tuned by a user;
thereafter detecting, using a processor, that no user captured within the image is viewing the display device, wherein the detecting occurs at a predetermined frequency selected by the user, wherein the detecting comprises estimating, using an eye tracking system, a focal point of the user, wherein a sensitivity of the detecting is tuned by the user;
responsive to said detecting no user is viewing the display device, performing a predetermined action to be performed is selected from a plurality of predetermined actions, wherein the predetermined action to be performed is selected by the user and is based upon a length of time that has elapsed between at least one of the plurality of users viewing the display device and no user viewing the display device, wherein the predetermined action comprises marking a position of the video content in cache and transferring contents of the cache to non-volatile memory, and performing an additional predetermined action selected from the group consisting of: pausing the video content, stopping the video content, adjusting a volume of audio associated with the video content, powering off a device displaying the video content, and continuing the video content for a predetermined time; and resuming the video content from the position upon detecting an active viewer.

\* \* \* \* \*